United States Patent [19]

Tiley

[11] Patent Number: 4,723,449

[45] Date of Patent: Feb. 9, 1988

[54] ELECTROMAGNETIC FLOWMETERS

[75] Inventor: Michael Tiley, Stroud, Great Britain

[73] Assignee: Danfoss A/S, Nordborg, Denmark

[21] Appl. No.: 931,201

[22] Filed: Nov. 17, 1986

[30] Foreign Application Priority Data

Nov. 25, 1985 [GB] United Kingdom ............... 8528964

[51] Int. Cl.$^4$ .............................................. G01F 1/60
[52] U.S. Cl. .................................................. 73/861.17
[58] Field of Search ........................ 73/861.16, 861.17

[56] References Cited

U.S. PATENT DOCUMENTS

| | | | |
|---|---|---|---|
| 3,943,765 | 3/1976 | Takada et al. | 73/861.17 |
| 4,206,641 | 6/1980 | Takada | 73/861.17 |
| 4,339,958 | 7/1982 | Shauger | 73/861.17 |

Primary Examiner—Charles A. Ruehl
Attorney, Agent, or Firm—Wayne B. Easton

[57] ABSTRACT

An electromagnetic flow meter of the type in which a magnetic field is applied across a fluid the flow of which is to be monitored, the field being applied in the form of pulses in forward and reverse directions, in which induced voltage pulses are taken from electrodes in contact with the fluid, and in which the induced voltage pulses are processed to provide a flow-representing output in the form of a frequency, the flowmeter comprising means to derive first and second signal levels from the amplitudes of the induced voltage pulses corresponding respectively to the forward and reverse directions of magnetic field, and integrator means arranged to receive the first and second signal levels alternately as an input, and to integrate in one direction in response to the first signal level until the output of the integrator means reaches a first reference level and to integrate in the opposite direction in response to the second signal level until the output of the integrator means reaches a second reference level, the frequency output being derived, in use, from the output of the integrator means.

18 Claims, 8 Drawing Figures

ELECTROMAGNETIC FLOWMETERS

This invention relates to electromagnetic flowmeters.

In a known type of electromagnetic flowmeter a magnetic field is applied across a fluid the flow of which is to be monitored, the field being applied in the form of pulses in forward and reverse directions, and induced voltage pulses are taken from electrodes in contact with the fluid and electronically processed to generate an output signal the frequency of which represents the flow rate of the fluid. The problem, however, arises of ensuring that the relationship between the output frequency and the signal taken from the electrodes is sufficiently linear.

The present invention provides an electromagnetic flowmeter of the type in which a magnetic field is applied across a fluid the flow of which is to be monitored, the field being applied in the form of pulses in forward and reverse directions, in which induced voltage pulses are taken from electrodes in contact with the fluid, and in which the induced voltage pulses are processed to provide a flow-representing output in the form of a frequency, the flowmeter comprising means to derive first and second signal levels from the amplitudes of the induced voltage pulses corresponding respectively to the forward and reverse directions of magnetic field, and integrator means arranged to receive the first and second signal levels alternately as an input, and to integrate in one direction in response to the first signal level until the output of the integrator means reaches a first reference level and to integrate in the opposite direction in response to the second signal level until the output of the integrator means reaches a second reference level, the frequency output being derived, in use, from the output of the integrator means.

Such a flowmeter is advantageous because the alternated directions of integration obviate the need to reset the integrator means to a reference level before each integration. Resetting of the integrator means would require a finite time and so detract from the linearity of the circuit. Such a flowmeter is also advantageous because the alternated directions of integration make it remarkably insensitive to DC-offset on the signal from the electrodes.

Preferably, correction means are provided to change at least one of the reference levels as the signals levels change to provide correction of the frequency output for switching delays. By this means the linearity of the flowmeter can be further improved. A particularly simple form of correction means comprises a resistive network to combine one or other of the signal levels with a fixed reference level to provide a variable reference level.

Preferably, the integrator means comprises operational amplifier means having a capacitor connected from the output to an inverting input of the operational amplifier means.

Preferably, the output of integrator means is connected to one input of a first comparator means and to one input of a second comparator means, and the first and second reference levels are connected to second inputs of the first and second comparator means respectively.

Preferably, the first and second comparator means each have an output connected to set and reset, respectively, a bistable multivibrator from which, in use, the frequency output is taken.

Preferably, the first and second signal levels are connected to the integrator means through respective gates and the bistable multivibrator is arranged to control the gates.

Preferably, the means to derive the first and second signal levels comprises a synchronous demodulator with peak-to-peak output.

Preferably, the synchronous demodulator with peak-to-peak output comprises first and second track and hold circuits.

Preferably the output of each track and hold circuit is connected to a respective capacitance circuit in order to present to the following stage a low source impedance for high frequency signals.

Advantageously, means are provided to tap the potential midway between the first and second signals and apply it to correct for DC-offset of the induced voltage pulses. By this means, the linearity of the flowmeter can be improved still further.

Preferably, the means to correct for DC-offset includes a feedback connection to change the DC-offset of input amplifier means of the flowmeter.

Advantageously, the means to correct for DC-offset includes amplifier means having an input connected to receive the tapped potential and its output connected to the input of the integrator means to make a nominal cancellation of the DC-offset at the input to the integrator means.

Advantageously, means are provided to measure the time the integrator means takes to integrate in the one direction, to measure the time the integrator means takes to integrate in the opposite direction, and to generate a flow-representing signal by forming the sum of quotients having the measured times as divisors. By this means, a flow-representing signal corrected for DC-offset at the input to the integrator can be obtained.

Preferably, the means to measure the integration times comprises means to measure the durations of the marks and spaces in the output of the bistable multivibrator.

Preferably, the means to measure the duration of the marks and spaces comprises counter means arranged to count clock pulses, means to detect transitions in the output of the bistable multivibrator, and means to read the contents of the counter means on the detection of a transition.

Advantageously, a microprocessor is provided to form the sum of the quotients having the measured times as divisors. The microprocessor can conveniently carry out general control and display functions in the flowmeter in addition to sum and quotient formation and microprocessor chips including circuits to constitute the means for measuring the duration of the marks and spaces are commercially available Advantageously, the microprocessor is arranged to form totals of the times taken to integrate in the one and opposite directions and to carry out division to form the quotients using the totals. By this means, because the microprocessor has fewer divisions to perform, it has more time available in which to carry out other functions.

A flowmeter constructed in accordance with the invention will now be described by way of example only with reference to the accompanying drawings, in which.

Figure 1:
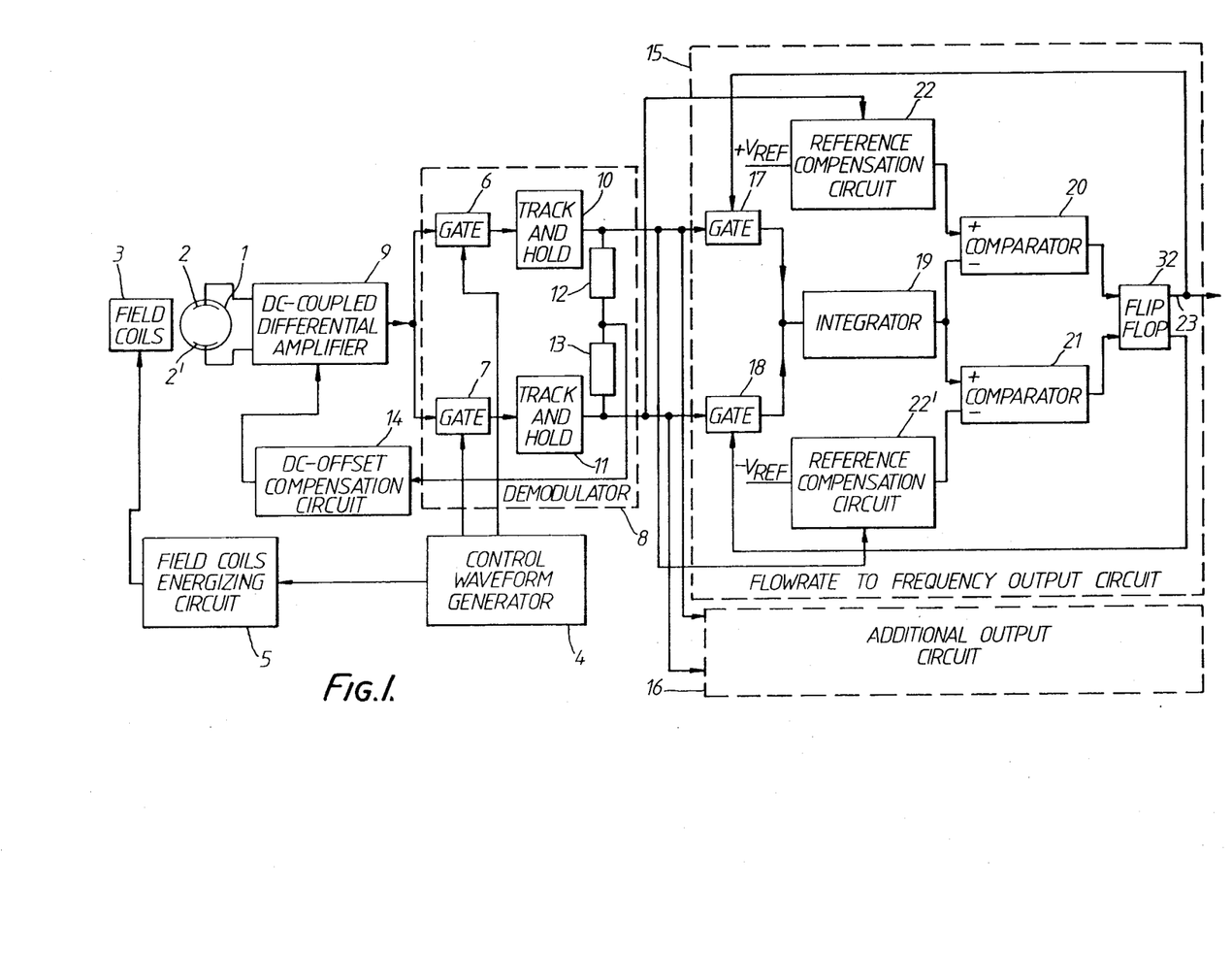
FIG. 1 is a schematic block diagram of the flowmeter.

Referring to FIG. 1, a flowmeter comprises a measuring conduit 1 provided with electrodes 2 and 2' arranged diametrically opposite each other and in electrical contact with liquid flowing through the conduit. Field coils 3 are provided in orthogonal relationship to the electrodes 2 and 2'. The arrangement of the measuring conduit 1, electrodes 2 and 2', and field coils 3 is conventional and will not be described further.

A control waveform generator 4 is connected to a field coil energizing circuit 5 and to the control inputs of analogue gates 6 and 7 in a demodulator circuit 8, the field coil energizing circuit being connected to the field coils 3.

Each of the electrodes 2, 2' is connected to a respective input of a DC-coupled differential amplifier 9, the output of the amplifier being connected to the analogue input of each of the gates 6 and 7. The output of each gate 6, 7 is connected to the input of a respective track and hold circuit 10 and 11. Two equal value resistors 12 and 13 are connected in series from one to the other of the outputs of the track and hold circuits 10 and 11 and the junction of the two resistors is connected to the input of a DC-offset compensation circuit 14, the output of which is connected to the DC-coupled differential amplifier 9.

The outputs of the track and hold circuits 10 and 11 are connected to a flowrate to frequency output circuit 15 and to an additional output circuit 16. The additional output circuit 16 may take any conventional form (for example, it may provide a drive for an electromagnetic counter) or may be omitted entirely if desired.

Each of the hold circuits 10 and 11 is connected to the analogue input of a respective one of two analogue gates 17 and 18 within the output circuit 15. The outputs of the gates 17 and 18 are connected to the input of an integrator 19. The output of the integrator 19 is connected to the inverting input of a comparator 20 and to the non-inverting input of a comparator 21. The non-inverting input of comparators 20 and 21 are connected to receive respectively positive and negative reference potential by way of respective reference compensation circuits 22 and 22'. The output of the track and hold circuits 11 and 10 are connected respectively to the reference compensation circuits 22 and 22'.

The outputs of the comparators 20 and 21 are connected to respective inputs of a flip flop (bistable multivibrator) 32, the outputs of the flip flop being connected respectively to the control inputs of the analogue gates 17 and 18. An output 23 is taken from one of the outputs of the flip flop 32.

The operation of the flowmeter will now be described with reference to the waveforms illustrated in FIG. 2.

The control waveform generator 4 supplies a square wave of typically 12 Hertz to the field coil energizing circuit 5 which supplies the field coils 3 with positive and negative current alternately in synchronism with the square wave from the control waveform generator 4. Waveform A in FIG. 2 shows the field coil current resulting from the excitation, the waveform being rounded owing to the effect of coil inductance.

Waveform B shows the potential across the electrodes 2 and 2', waveform B corresponding generally to waveform A but being superimposed on a DC offset owing to electrochemical effects and including undesired noise. The magnitude of the AC component of waveform B at the excitation frequency is the useful part of the signal and represents the flow rate of the liquid flowing in the conduit 1.

Figure 2:
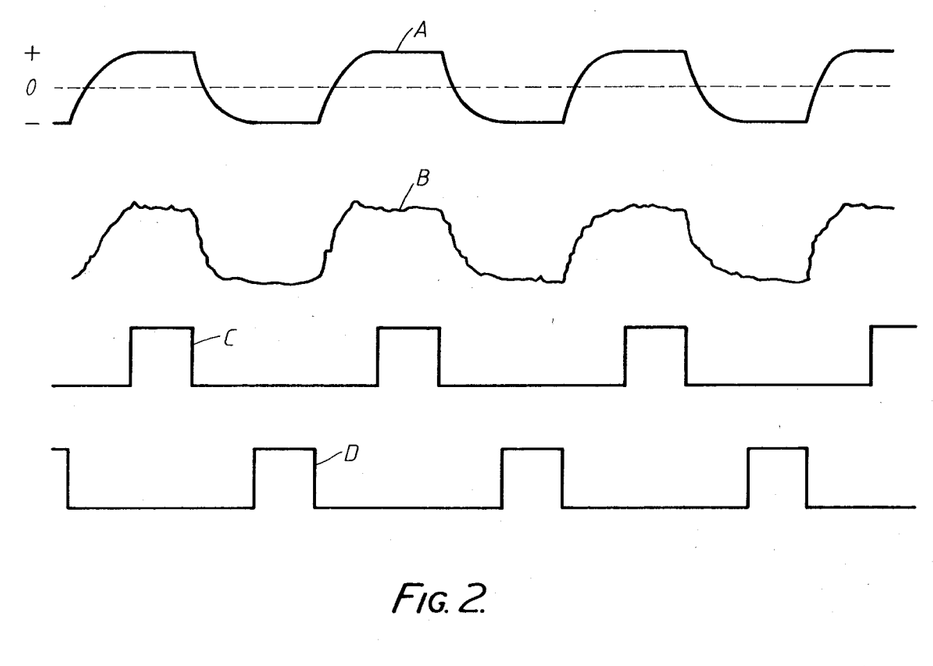
FIG. 2 is a diagram of waveforms occuring in the flowmeter.

Waveform C represents the waveform applied by the control waveform generator 4 to the gate 6 and it can be seen from FIG. 2 to correspond to the second half of the more positive half-cycles of the waveform B. Waveform D represents the waveform applied by the control waveform generator 4 to the gate 7 and it can be seen from FIG. 2 to correspond to the second half of the more negative half-cycles of the waveform B. The waveforms C and D are used to open the gate 6 and 7 at the times when the waveform B is more or less steady and is not still building up owing to inductance effects in the field coils.

The signal across the electrodes 2 and 2' (waveform B) is amplified by the differential amplifier 9 whilst the compensation circuit 14 applies a correction signal to the amplifier to nullify the DC offset of the waveform B.

The amplified signal corrected for DC-offset is applied to the inputs of the gates 6 and 7. The second half of the positive half-cycles of the amplified signal are passed by the gate 6 to the track and hold circuit 10, and the second half of the negative half-cycles of the amplified signal are passed by the gate 7 to the track and hold circuit 11.

When either of the gates 6 or 7 is enabled by the control waveform generator 4, the associated track and hold circuit is operative and attempts to follow the signal passed to it by the gate. When, however, the gate is disabled the output of the track and hold circuit simply holds the previously attained value.

The difference signal between the output of the track and hold circuit 10 and that of the circuit 11 represents the peak to peak amplitude of the signal at the output of the amplifier 9. The potential midway between the peaks is tapped from the junction of the equal value resistors 12 and 13 and applied as a correction signal by way of the DC-offset compensation circuit 14 to the amplifier 9. When the DC-offset is perfectly compensated the potential midway between the peaks is zero. Thus, the output of the track and hold circuit 10 is a positive signal and that of circuit 11 a negative signal and the difference between the two signals represents flowrate.

That difference signal is converted to a frequency representing flowrate (with 10 kiloHertz representing full scale) by the output circuit 15.

Gates 17 and 18 are selected alternately by the flip flop 32 so that the integrator 19 either integrates upwardly or downwardly depending on which of the gates 17 or 18 is selected by the flip flop. The output of the integrator 19 is, however, compared by comparators 20 and 21 with reference values and the outputs of these comparators set and reset the flip flop 32. The arrangement is such that then integrator 19 integrates upwardly until an upper reference value is attained and then the flip flop is changed over and the integrator caused to integrate downwardly until a lower reference value is attained whereupon the flip flow changes back again and so on. The time taken for the integrator 19 to reach one or other of its reference values depends on the magnitude of its input signal and by this means an output frequency can be taken at output 23 of the flip flop 32 which is representative of the magnitude of the output of the demodulator (representing flowrate).

Since, however, some switching delays will inevitably occur in the circuitry, the relationship between output frequency and demodulator output will not be quite linear and in fact will be too low by an increasing amount as the demodulator output increases. The reference compensation circuits 22 and 22' serve respectively to decrease the upper reference value and increase (make less negative) the lower reference value as the demodulator output increases to correct the relationship between output frequency and demodulator output. If desired, one reference compensation circuit could be omitted and only one of the upper and lower values corrected since the slight assymetry of operation resulting from correcting only one reference value may be acceptable in some applications.

Detailed circuits for use in the flowmeter will now be described with reference to FIGS. 3 to 7 of the accompanying drawings.

Figure 3:
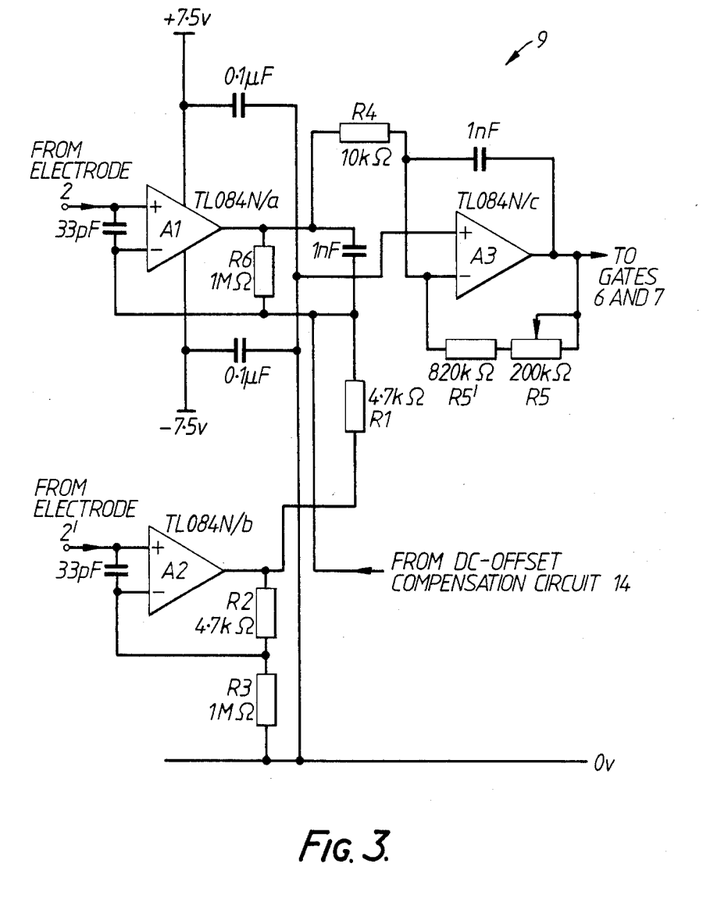
FIG. 3 is a circuit diagram of a DC-coupled differential amplifier used in the flowmeter.

FIG. 3 shows a detailed circuit for implementing the DC-coupled differential amplifier 9 and comprises three differential amplifiers A1, A2 and A3. Electrode 2 is connected to the non-inverting input of amplifier A1 and electrode 2' is connected to the non-inverting input of amplifier A2.

The inverting input of amplifier A1 is connected to one end of a resistor R1, the other end of which is connected to one end of a resistor R2. The other end of resistor R2 is connected to one end of a resistor R3, the other end of which is connected to common potential.

The inverting input of amplifier A2 is connected to the junction of resistors R2 and R3 and the output of the amplifier is connected to the junction of R1 and R2.

The output of amplifier A1 is connected to one end of a resistor R4, the other end of which is connected to the inverting input of amplifier A3. The series connection of a variable resistor R5 and a fixed resistor R5' is connected from the output to the inverting input of amplifier A3.

The output from the DC-offset compensation circuit 14 is connected to the inverting input of amplifier A1. A resistor R6 is connected from the output of amplifier A1 to the inverting input of that amplifier.

Other components desirable in a practical implementation and the type and value of suitable components for the circuit are shown in the Figure. The indicated type for the operational amplifiers is a device with FET input circuitry.

The resistors R6, R1, R2 and R3 define a resistive output network for the amplifiers A1 and A2, set the gain provided by the amplifiers A1 and A2, and receive the output of the DC-offset compensation circuit 14.

Figure 4:
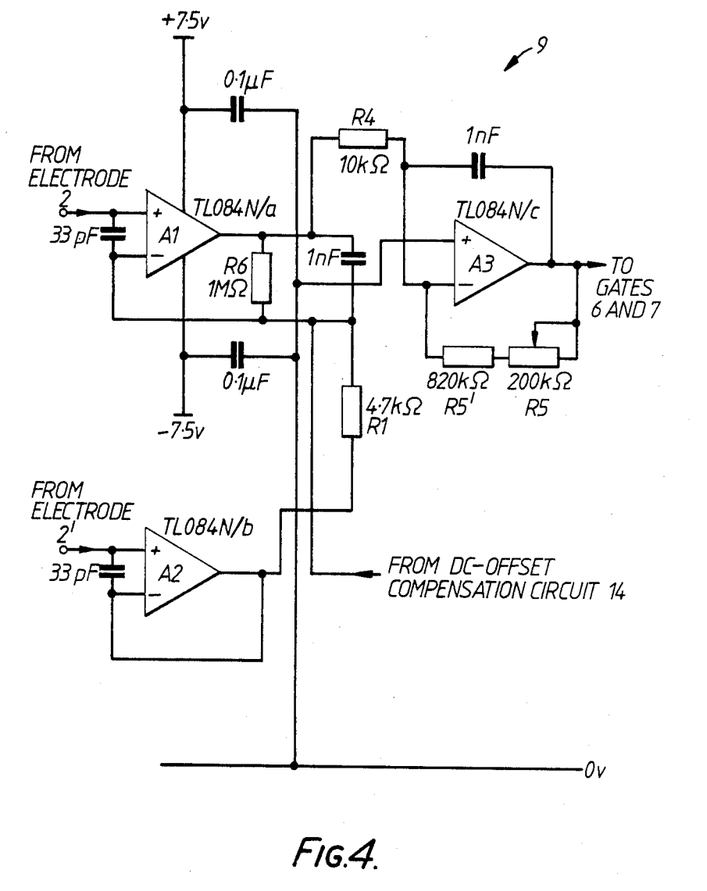
FIG. 4 shows a modification to the amplifier of FIG. 3.

FIG. 4 shows a modification of the circuit of FIG. 3, the only difference being that the resistors R2 and R4 are omitted and the output of the amplifier A2 is connected directly to its inverting input.

In the circuit of FIG. 4, amplifier A2 is used as a simple voltage follower and the output of amplifier A2 simply follows the signal applied to the non-inverting input of amplifier A2, that is, amplifier A2 provides unity gain.

Amplifier A3 (in both FIG. 3 and FIG. 4) functions as an inverter of adjustable gain, the gain of the circuits being—(R5+R5')/R4 where R4, R5 and R5' are the values of the resistors R4, R5 and R5' respectively. Resistor R4, for which no value is shown, is chosen so that the gain provided by amplifier A3 is approximately suited to the range of flowrates to be measured. Variable resistor R5 is provided to enable the gain roughly-adjusted by the choice of value for resistor R4 to be calibrated to the required degree of exactness.

Figure 5:
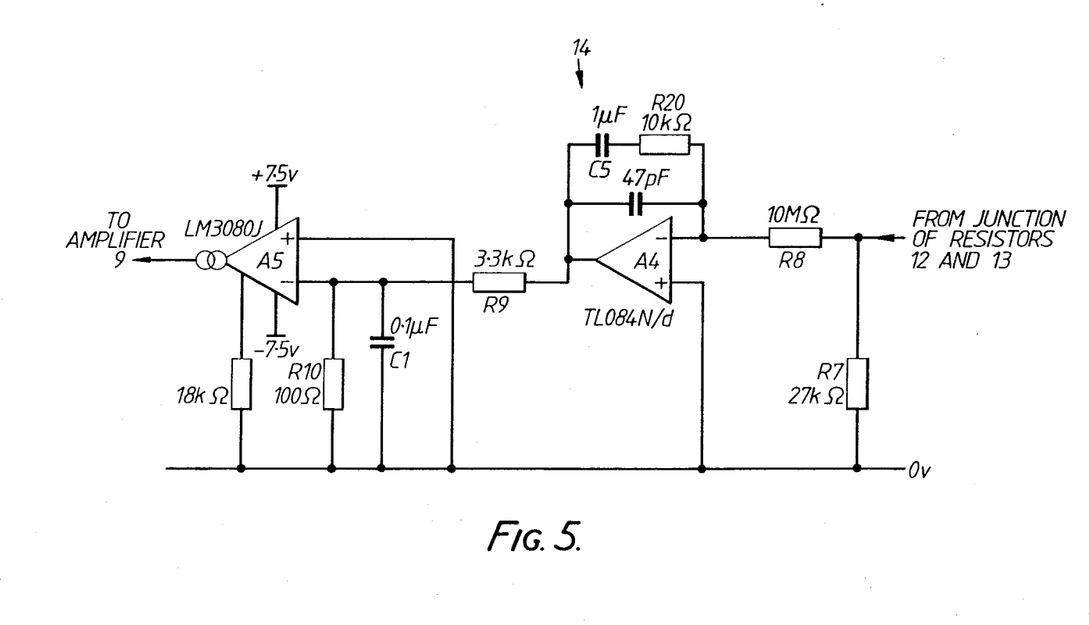
FIG. 5 is a circuit diagram of a DC-offset compensation circuit used in the flowmeter.

FIG. 5 shows a detailed circuit for implementing the DC-offset compensation circuit 14, the circuit comprising a differential amplifier A4 and a differential input transconductance amplifier A5.

The junction of resistors 12 and 13 is connected to one end of a resistor R7, the other end of which is connected to common potential. The junction of resistors 12 and 13 is also connected to one end of a resistor R8, the other end of which is connected to the inverting input of amplifier A4. The non-inverting input of amplifier A4 is connected to common potential.

The output of amplifier A4 is connected to one end of a resistor R9, the other end of which is connected to the inverting input of the transconductance amplifier A5. The parallel combination of a resistor R10 and a capacitor C1 is connected between the inverting input of the transconductance amplifier A5 and common potential. The non-inverting input of amplifier A5 is connected to common potential.

One end of a capacitor C5 is connected to the output of amplifier A4 and has its other end connected to one end of a resistor R20. The other end of the resistor R20 is connected to the inverting input of amplifier A4.

Other components desirable in a practical implementation and the type and value of suitable components are shown in FIG. 5.

The inclusion of the capacitor C5 in the feedback connection from the output to the inverting input of amplifier A4 modifies the frequency response of that amplifier to decrease its gain at higher frequencies, amplifier A4 functioning as an inverter amplifier for signals from the junction of resistors 12 and 13.

The inclusion of the capacitor C1 in the inverting input circuitry of amplifier A5 modifies the frequency response of that amplifier to give it a low-pass frequency characteristic. The function of transconductance amplifier A5 is to convert the DC or near DC signals at its inverting input into a proportional output current of opposite sign to the DC or near DC input signal. The gain/frequency characteristic of amplifiers A4 and A5 in combination is such that the gain is greatest near DC, then falls away, then reaches a plateau, and then falls away again.

Figure 6:
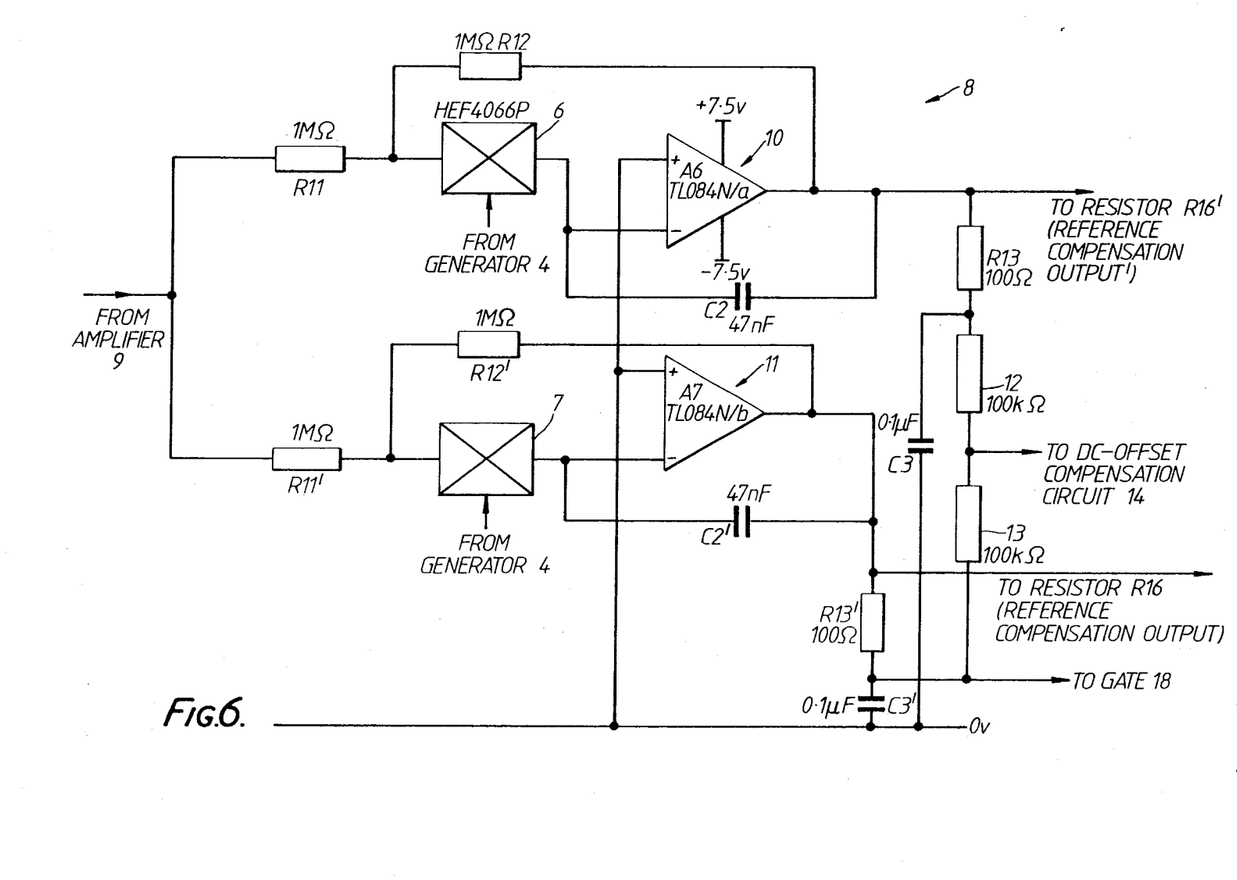
FIG. 6 is a circuit diagram of a demodulator circuit used in the flowmeter.

FIG. 6 shows a detailed circuit for implementing the demodulator 8. The track and hold circuits 10, 11 comprise respective differential amplifiers A6 and A7. The inverting inputs of amplifiers A6 and A7 are connected to common potential and each has its non-inverting input connected to the output of a respective one of the gates 6 and 7.

Resistors R11 and R11' are connected from the output of amplifier 9 to the input of a respective one of the gates 6 and 7. Resistors R12 and R12 are connected from the output of a respective one of the amplifiers A6 and A7 to the input of a respective one of the gates 6 and 7. Capacitors C2 and C2' are connected from the output to the inverting input of a respective one of the amplifiers A6 and A7.

The output of amplifiers A6 and A7 are connected respectively to one end of resistors R13 and R13'. The other ends of resistors R13 and R13' are connected to one end of respective capacitors C3 and C3', the other ends of which are connected to common potential.

The series-connected resistors 12 and 13 are connected from the junction of resistor R13 and capacitor C3 to the junction of resistor R13' and capacitor C3'.

The type and values of suitable components are shown in FIG. 6.

The amplifiers A6 and A7 are operative to integrate the output from amplifier 9 at the instants when their respective gates 6 and 7 provide a conductive path. At the instants when the gates 6 and 7 are non-conductive the amplifiers A6 and A7 hold, at their output, the value of the integrated signal.

The DC gains provided by the amplifiers 6 and 7 are set, respectively, by the resistors R11, R12 and R11', R12'. The capacitors C2 and C2' define the integrating characteristic of their respective amplifiers A6 and A7.

Each of the amplifiers A6 and A7 has its output connected to a respective network constituted by resistor R13 in combination with capacitor C3 and resistor R13' in combination with capacitor C3' in order to present to the following stage a low source impedance for high frequency signals.

If the waveform B shown in FIG. 2 is symmetrical about common potential, then the potential across capacitor C3 will be equal and opposite to the potential across capacitor C3' because of the symmetrical nature of the circuitry of the flowmeter. In that case the potential at the junction of resistors R12 and R13 will likewise be common potential (0 volts). On the other hand, if waveform B is asymmetrical about common potential then the potential across capacitor C3 will differ in magnitude from the potential across capacitor C3' and the potential at the junction of resistors R12 and R13 will differ from common potential. The potential at the junction of resistors R12 and R13 serves as an error signal for correcting DC-offset at the input stage (FIG. 3 or FIG. 4) by means of the DC -offset compensation circuit (FIG. 5).

Figure 7:
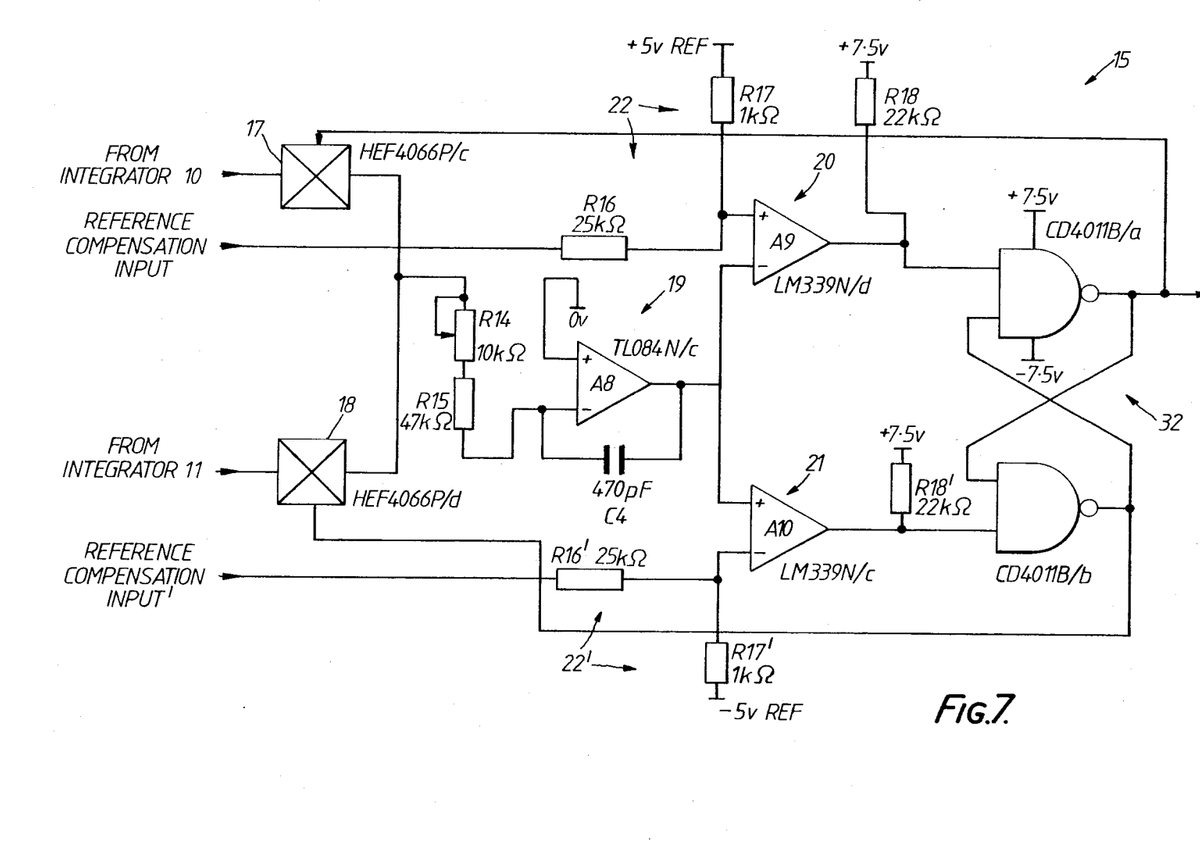
FIG. 7 is a circuit diagram of an output circuit used in the flowmeter.

FIG. 7 shows a detailed circuit for implementing the output circuit 15. The integrator 19 comprises a differential amplifier of which the non-inverting input is connected to common potential and the output is connected to the inverting input by a capacitor C4. The outputs of the gates 17 and 18 are joined together and connected to one end of the series combination of a variable resistor R14 and a fixed resistor R15. The other end of that series combination is connected to the inverting input of amplifier A8.

The comparators 20 and 21 comprise respective differential amplifiers A9 and A10. The output of amplifier A8 is connected to the inverting input of amplifier A9 and to the non-inverting input of amplifier A10. The non-inverting input of amplifier A9 is connected to one end of a resistor R16 and to one end of a resistor R17. The other end of resistor R16 is connected to the output of amplifier A7 (FIG. 6) and the other end of resistor R17 is connected to +5 volts reference potential. The resistors R16 and R17 constitute the reference compensation circuit. The inverting input of amplifier A10 is connected to −5 volts reference potential.

The outputs of amplifiers A9 and A10 are connected to respective inputs of the flip flop 32 which is of RS type and to positive potential by respective pull-up resistors R18 and R18'.

The type and value of suitable components are shown in FIG. 7.

Figure 8:
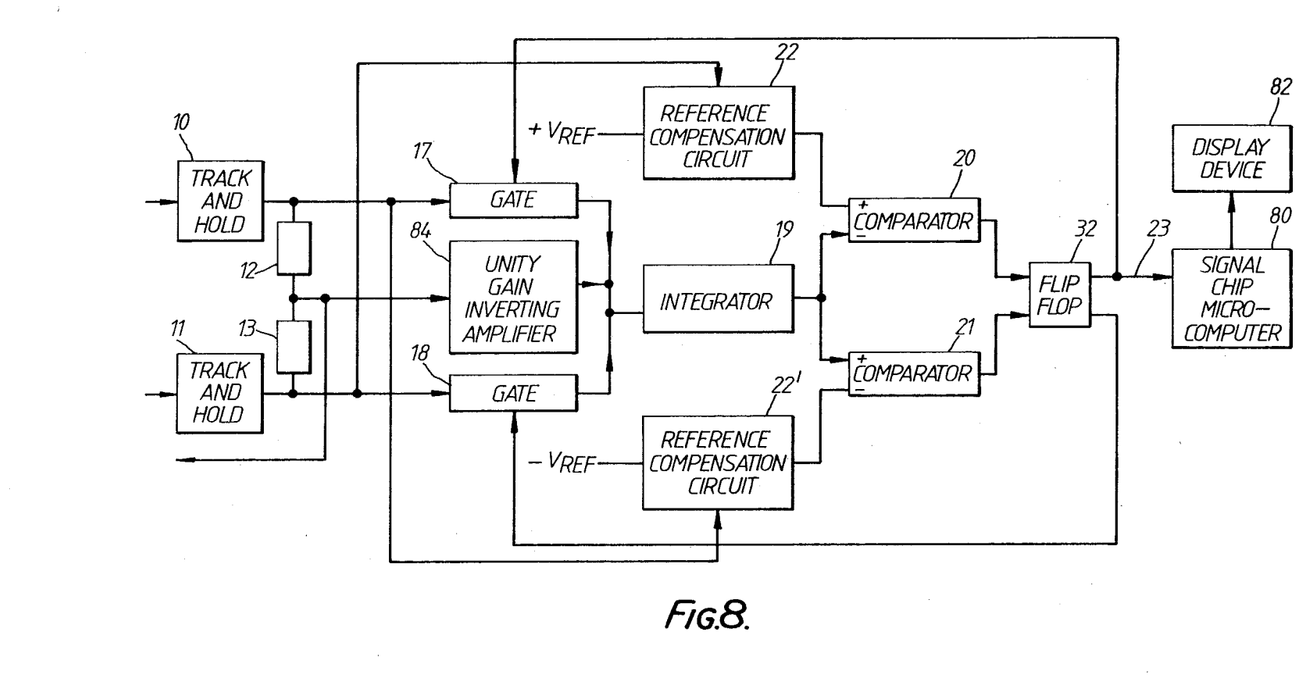
FIG. 8 is a schematic block diagram corresponding to a portion of FIG. 1 and shows a modification to the flowmeter.

FIG. 8 shows a modification which enables further correction for common mode DC-offset to be made or which may be applied to the integrator when used with different input circuitry not including the present feedback for DC-offset correction.

Referring to FIG. 8, the output 23 from the flip flop 32 is connected to a single chip microcomputer 80. The single chip microcomputer 80 is connected to a display device 82. A unity gain inverting amplifier 84 is optionally connected from the junction of resistors 12 and 13 to the input of the integrator 19.

The single chip microcomputer 80 is a microprocessor of the Hitachi 6301 microprocessor family, for example, the Hitachi 63701Y microprocessor. The microprocessor is provided with a suitable crystal (not shown) for its clock oscillator and constitutes a complete microcomputer on a single chip. The Hitachi 63701Y microprocessor chip includes a RAM, an EPROM, timer circuitry and a multiplicity of user ports in addition to the registers of the microprocessor proper.

By means of suitable software programming and connections to its user ports (not shown), the microcomputer 80 is given the task of implementing the control waveform generator 4 and any additional output circuit 16, and of driving the display device 82. Since the use of microprocessors as control devices is well known in general, those aspects will not be discussed in more detail.

A timer, the so-called "timer 1", of the microcomputer 80 is used to perform a correction for any residual common mode DC-offset at the input of the integrator 19.

The Hitachi 63701Y microprocessor has an "input frequency capture" facility and the output of the flip flop 32 is connected to the corresponding input pin of the microprocessor. By means of suitable software programming, the input frequency capture facility is arranged to generate an "interrupt" on each transition in the input waveform. The timer is software controlled and comprises a 16 bit counter arranged to count pulses from the microprocessor clock and to generate an interrupt when an overflow (that is to say, a change in the counter contents from FFFF hexadecimal to 0000) occurs.

The software program causes the following functions to be carried out:

every time the timer counter generates an interrrupt on overflowing, a variable representing the number of overflows which have occurred is incremented by one, every time the input frequency capture facility generates an interrupt on the detection of a transition going in one direction, the capture facility is reset to look for a transition going in the opposite direction, every time a transition is detected, the accumulated count (the value represented by the number-of-overflows variable plus the instantaneous value of the count stored in the timer counter) is read into a register of the microprocessor.

The software program also carries out the following arithmetic operations:

the difference between the current accumulated count read-out to the register and the last accumulated count read-out is calculated for a mark (identified by a positive-going transition followed by a negative-going transition in the output 23), the difference between the current accumulated count read out and the last accumulated count read out is calculated for the space (identified by a negative-going transition followed by a positive going transition in the output 23) following the mark, the calculated difference representing the mark is divided into a pre-set value, the caculated difference representing the space is divided into the same pre-set value, the two division results are added together and sent to be displayed on the display device 82.

An explanation as to how the circuitry, described with reference to FIG. 8 corrects for common mode DC-offset is given below.

Let it be supposed that the signal voltages at the output of gates 17 and 18 are $+V_{sig}$ and $-V_{sig}$ respectively and that there is a common mode DC-offset voltage of $V_{off}$ superimposed. Thus, the integrator 19 receives an input voltage of $V_{sig}+V_{off}$ when gate 17 is enabled, and an input voltage of $V_{off}-V_{sig}$ when gate 18 is enabled. Now, the times, $t_1$ and $t_2$, taken from the output of the integrator to reach the appropriate reference value from these values of input voltage are given by:

$$t_1 = K/(V_{sig}+V_{off})$$

$$t_2 = K/(V_{sig}-V_{off}),$$

where K is a constant.

The frequency of the waveform generated by the integrator has a period of $t_1+t_2$ which from the above equations is given by:

$$K/(V_{sig}+V_{off})+K/(V_{sig}-V_{off})$$

which is dependent on both $V_{sig}$ and $V_{off}$ and therefore contains an error related to the DC-offset at the input to the integrator.

On the other hand, the expressions for $t_1$ and $t_2$ may be combined to yield:

$$V_{sig}=A(1/t_1+1/t_2),$$

where A is a constant.

It is to be noted that this expression is independent of $V_{off}$ showing that the value of $V_{sig}$ unaffected by the common mode DC-offset voltage $V_{off}$ can be derived from $t_1$ and $t_2$.

Now, the marks and spaces in the output 23 of flip flop 32 correspond to $t_1$ and $t_2$ and thus by measurement of the durations of the marks and spaces and the use of an empirically-determined scale factor, the value of $V_{sig}$ can be calculated independently of $V_{off}$. That is the operation which is performed in the micro-computer 80. A further advantage is that the scale factor can be preselected to set the range of the flowmeter thus avoiding the need to preset the range by means of a range-setting resistor.

The optional inclusion of the unity gain inverting amplifier 84 enables a nominal correction to be made for common mode DC-offset voltage present at the outputs of the track and hold circuits 10 and 11. This nominal correction is achieved by adding to the input to the integrator 19 a DC-offset voltage opposite and nominally equal to that in the signals it receives from gates 17 and 18. By this means, it can be ensured that the DC-offset voltage is kept very small so that the circuit will work satisfactorily even when when the signal voltage is itself quite small and otherwise in danger of being swamped by the DC-offset voltage.

In order to allow the microprocessor more time in which to perform its other functions, the integrator 19 is provided with a larger value of integration capacitor C4 than that shown in FIG. 7 so that full scale is represented not by 10 kiloHertz as before but by 500 Hertz (or 1000 transitions per second). It is also possible, if desired, to give the microprocessor more time to perform its other functions by reducing the number of division operations it has to perform. The number of division operations can be reduced by so arranging the software program that the values of several marks are added together, the values of several spaces are added together and only then (rather than after the determination of each mark and space) is division performed.

What is claimed is:

1. An electromagnetic flowmeter of the type in which a magnetic field is applied across a flow of fluid to be monitored, the field being applied in the form of pulses in forward and reverse directions, in which induced voltage pulses are taken from electrodes in contact with the fluid, and in which the induced voltage pulses are processed to provide a flow-representing output in the form of a frequency, the flowmeter comprising, means to derive first and second signal levels from the amplitudes of said induced voltage pulses corresponding respectively to the forward and reverse directions of said magnetic field, and integrator means arranged to receive said first and second signal levels alternately as an input, and to integrate in one direction in response to said first signal level until the output of said integrator means reaches a first reference level and to integrate in the opposite direction in response to said second signal level until the output of said integrator means reaches a second reference level, and means for deriving said frequency output from the output of said integrator means.

2. A flowmeter as claimed in claim 1 wherein correction means are provided to change at least one of said reference levels as said signal levels change to provide correction of said frequency output for switching delays.

3. A flowmeter as claimed in claim 1 wherein said correction means includes means for providing a fixed reference level, a resistive network to combine one or the other of said signal levels with said fixed reference level to provide a variable reference level.

4. A flowmeter as claimed in claim 1 wherein said integrator means includes operational amplifier means having inverting and noninverting inputs and a capacitor connected from the output thereof to said inverting input.

5. A flowmeter as claimed in claim 1 including first and second comparator means, said integrator means having the output thereof connected to one input of said first comparator means and to one input of said second comparator means, said first and second reference levels being connected to second inputs of said first and second comparator means respectively.

6. A flowmeter as claimed in claim 5 including a bistable multivibrator having set and reset inputs, said first and second comparator means each having an output connected to said set and reset inputs respectively, said multivibrator having an output from which said frequency output is taken.

7. A flowmeter as claimed in claim 6 including gate means, said first and second signal levels being connected to said integrator means through said gate means and said multivibrator arranged to control said gate means.

8. A flowmeter as claimed in claim 6 wherein means are provided to measure the times said integrator means takes to integrate in both directions and to generate a flow-representing signal by forming the sum of quotients having said measured times as divisors.

9. A flowmeter as claimed in claim 8 wherein said means to measure said times includes means to measure the duration of the marks and spaces in the output of said bistable multivibrator.

10. A flowmeter as claimed in claim 9 wherein said means to measure the duration of said marks and spaces includes counter means arranged to count clock pulses, means to detect transitions in the output of said bistable multivibrator, and means to read the contents of said counter means on the detection of a transition.

11. A flowmeter as claimed in claim 9 including a microprocessor for forming said sum of quotients having said measured times as divisors.

12. A flowmeter as claimed in claim 11 wherein said microprocessor is arranged to form totals of the times taken to integrate in the one and opposite directions and to carry out division to form said quotients using the totals.

13. A flowmeter as claimed in claim 1 wherein said means to derive said first and second signal levels include a synchronous demodulator with peak-to-peak output.

14. A flowmeter as claimed in claim 13 wherein said synchronous demodulator with peak-to-peak output includes first and second track and hold circuits.

15. A flowmeter as claimed in claim 14 including respective capacitance circuits to which said output of each of said track and hold circuits is connected to present to the following stage a low source impedance for high frequency signals.

16. A flowmeter as claimed in claim 14 including correcting means to correct for DC-offset of said induced voltage pulses and tapping means to tap the potential midway between said first and second signals and apply it to said correcting means.

17. A flowmeter as claimed in claim 16 including input amplifier means, and said correcting means to correct for DC-offset includes a feedback connection to change the DC-offset of said input amplifier means.

18. A flowmeter as claimed in claim 16 wherein the means to correct for DC-offset includes amplifier means having an input connected to receive the tapped potential and its output connected to the input of the integrator means to make a nominal cancellation of the DC-offset at the input to the integrator means.

* * * * *